United States Patent
Brettschneider et al.

(10) Patent No.: US 11,273,466 B2
(45) Date of Patent: Mar. 15, 2022

(54) SCREEN PRODUCTION METHOD

(71) Applicant: Voith Patent GmbH, Heidenheim (DE)

(72) Inventors: Werner Brettschneider, Grünkraut (DE); Ingo Kauer, Bad Buchau (DE); Melanie Schädler, Gerstetten (DE); Ralf Burger, Böhmenkirch (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/897,517

(22) Filed: Jun. 10, 2020

(65) Prior Publication Data

US 2020/0298278 A1 Sep. 24, 2020

Related U.S. Application Data

(63) Continuation of application No. PCT/EP2018/078317, filed on Oct. 17, 2018.

(30) Foreign Application Priority Data

Dec. 13, 2017 (DE) ...................... 10 2017 129 752.9

(51) Int. Cl.
*B07B 1/18* (2006.01)
*B07B 1/46* (2006.01)
*B01D 29/44* (2006.01)

(52) U.S. Cl.
CPC .............. *B07B 1/4618* (2013.01); *B07B 1/18* (2013.01); *B01D 29/445* (2013.01); *B01D 2201/287* (2013.01)

(58) Field of Classification Search
CPC ....... B07B 1/18; B07B 1/4618; B07B 1/4645; B01D 29/445; B01D 2201/287
See application file for complete search history.

(56) References Cited

U.S. PATENT DOCUMENTS

| | | | |
|---|---|---|---|
| 4,846,971 A | 7/1989 | Lamort | |
| 5,094,360 A * | 3/1992 | Lange | D21D 5/16 220/485 |

(Continued)

FOREIGN PATENT DOCUMENTS

| | | |
|---|---|---|
| DE | 44 35 538 A1 | 4/1996 |
| DE | 10 2013 224 528 B3 | 7/2014 |
| WO | 2015/180955 A1 | 12/2015 |

OTHER PUBLICATIONS

Notification of the Transmission of the International Search Report and Written Opinion of the International Search Authority or Declaration dated Jan. 21, 2019 for International Application No. PCT/EP2018/078317 (10 pages).

(Continued)

*Primary Examiner* — Joseph C Rodriguez

(74) *Attorney, Agent, or Firm* — Taylor IP, P.C.

(57) ABSTRACT

A method for producing a cylindrical screen device with a plurality of profiled bars. The outer face of a plurality of mutually spaced annular bar holders, which are arranged perpendicular to the cylinder axis, are provided with recesses that are open at the edges. The recesses have a shape that substantially corresponds to the base of profiled bars in a complimentary manner. The recesses are marginally larger than the bases. The profiled bars are inserted into respective recesses, parallel to one another and parallel to cylinder axis.

10 Claims, 1 Drawing Sheet

(56) References Cited

U.S. PATENT DOCUMENTS

| | | | | |
|---|---|---|---|---|
| 6,460,757 | B1* | 10/2002 | Ommundsen | B07B 1/4618 |
| | | | | 228/141.1 |
| 6,789,681 | B2* | 9/2004 | Czerwoniak | B07B 1/18 |
| | | | | 209/405 |
| 7,125,491 | B2* | 10/2006 | Gabi | B01D 29/115 |
| | | | | 210/497.01 |
| 7,188,733 | B2* | 3/2007 | May | B01D 29/111 |
| | | | | 210/490 |
| 8,469,198 | B2* | 6/2013 | Hetu | B07B 1/4627 |
| | | | | 209/305 |
| 9,290,886 | B2* | 3/2016 | Asikainen | D21D 5/16 |
| 2002/0130075 | A1 | 9/2002 | May et al. | |
| 2007/0221544 | A1* | 9/2007 | Chen | D21D 5/16 |
| | | | | 209/270 |

OTHER PUBLICATIONS

German Office Action dated Jun. 13, 2018 for German Application No. 10 2017 129 752.9 (8 pages).

* cited by examiner

SCREEN PRODUCTION METHOD

CROSS REFERENCE TO RELATED APPLICATIONS

This is a continuation of PCT application No. PCT/EP2018/078317, entitled "SCREEN PRODUCTION METHOD", filed Oct. 17, 2018, which is incorporated herein by reference.

BACKGROUND OF THE INVENTION

1. Field of the Invention

The present invention relates to a screen device for screening of fibrous stock suspensions, as implemented in pressure screens used in the paper producing industry.

The present invention further relates to a method for producing a cylindrical screen device.

2. Description of the Related Art

In the process of screening fibrous stock suspension, in the paper producing industry, fibers contained in the suspension are to pass through the screen, while the undesirable solid components are rejected at the gap and are directed out of the screening device.

Due to the fact that the openings have a substantially elongated shape—in other words that they are slots or gaps—fibrous particles are passed through more easily than cuboid ones, even if both types are of a similar size.

With such screening technology an excellent removal effect of non-fibrous contaminants from the fibrous stock suspension is therefore possible.

It is also conceivable for use in the separation of different fiber components, the so-called fiber fractionation. However, a prerequisite for this is high precision of the slot shape over the entire screen surface.

One possible method for producing such screen baskets is described in DE 44 35 538A1, wherein the profiled bars are clamped due to plastic deformation of the c-shaped retaining rings which are provided with recesses for the bars. Herein, especially suitable profiled bars are used for such production methods. With the assistance of this method it was possible to substantially reduce production costs. The method is used with screen baskets where the bars are inserted on the outside edge of the retainer rings. Such configuration of the bars is selected if the suspension is to pass through the slots from the outside to the inside (centripetal operation). For securing the profile bars the radius of the curvature of the retainer rings is being enlarged.

It is herein important, that the dimensions of the screen openings are maintained with very low tolerances. To keep them free of blockages, scrapers are usually necessary which are moved at a small distance over the screen surface and which produce hydraulic impulses. Screen devices for uses in pressure screens must therefore be fabricated very precisely and must be able to withstand high loads.

What is needed in the art is a method for producing a centripetal screen device which reduces the production complexity while improving strength and increasing the service life of the centripetal screen device.

SUMMARY OF THE INVENTION

The present invention provides a method for producing a cylindrical screen device with a plurality of profiled bars, wherein the outer face of a plurality of mutually spaced annular bar holders which are arranged perpendicular to the cylinder axis are provided with recesses that are open at the edges, have a shape that substantially corresponds to the base of the profiled bars in a complimentary manner and which are marginally larger than the bar bases, and wherein the profiled bars are inserted into the recesses parallel to one another and parallel to the cylinder axis According to the invention, the profiled bars are pressed into the recesses via forces acting radially from the outside onto the profiled bars until a form-fitting connection is produced.

Since the bar holder is already in the form of a ring and is generally designed as a single component, production is substantially simplified. In addition to an exact cylindrical shape, a high precision results thereby in the recesses and thus also the screen openings.

As a consequence of pressing the profiled bars in the direction of the recesses in the bar holder the clearance between profiled bar and recess is reduced which eventually leads to clamping of both. In addition to clamping, a hardening increase occurs during this plastic deformation.

In many cases it may be sufficient if fastening the profiled bars in the recesses of the bar holders occurs exclusively through the clamping that occurs as a result of pressing the profiled bars in radial direction.

If this is not sufficient, the profiled bars of the bar holders must be fastened in their recesses by way of welding, gluing or using any other desired fastener.

If the introduction of force occurs only from the outside, then the inside of the bar holders is not subjected to supporting or bending forces during radial pressing of the profiled bars, thus protecting them.

Production is especially simple if radial pressing of the profiled bars occurs via several ram segments acting upon the profiled bars, radially from the outside.

These ram segments may be arranged at equal distances over the circumference of the bar holders. Moreover, the pressing surface of the ram segments facing in the direction of the profiled bars should be of concave design, wherein said pressing surface is formed advantageously perpendicular to the cylinder axis by a circular segment, the radius of which corresponds to the outer radius of the finished cylindrical screen device. This allows the forces to be distributed increasingly more uniformly upon the radial outside of the bar holders during the pressing process. Moreover, the arrangement is simplified if the ram segments respectively act upon a number of profiled bars.

In the interest of exact guidance, the ram segments should be guided in a radially movable manner at least during the radial pressing process and/or should be fastened axially relative to the cylinder axis.

Due to the method of the present invention, and particularly to the profiled bars being pressed into the recesses via forces acting radially from the outside onto the profiled bars until a form-fitting connection is produced, the production complexity is reduced while improving strength and increasing the service life of the screen device.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

Figure 1:
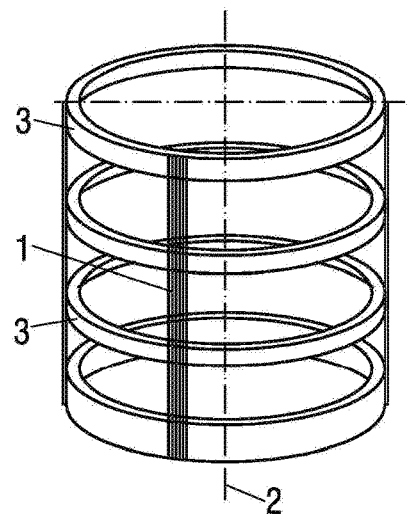
FIG. 1 is a schematic view of a cylindrical screen basket according to an embodiment of the present invention.
Figure 2:
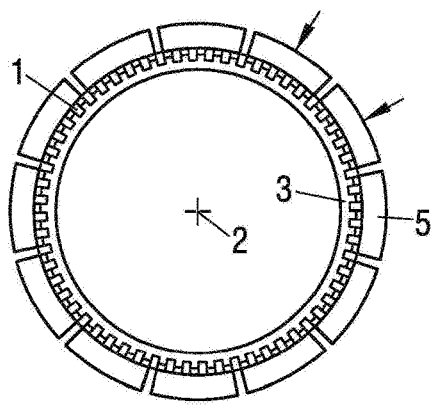
FIG. 2 is a schematic cross-sectional view through the screen basket of FIG. 1.

Referring now to the drawings, and more particularly to FIGS. 1-2, there is shown a cylindrical screen basket.

Bar holders 3 are manufactured as single-component rings, for example by way of laser cutting. This is the basis for high dimensional accuracy of the screen basket.

On their outside, bar holders 3 have a plurality of equally spaced recesses 4 for profiled bars 1. According to FIG. 3A, recesses 4 offer sufficient clearance, so that profiled bars 1 can be slid axially without problem through said recesses 4.

As a result, the thus prefabricated screen basket consists of profiled bars 1 which are arranged parallel to cylinder axis 2 and which are held by a number of bar holders 3 that are axially distanced from one another and are arranged perpendicular to cylinder axis 2. In this regard, the profiled bars 1 are perpendicular to the bar holders 3. As can be appreciated, the screen basket defines the cylinder axis 2.

The screen openings in the screen basket are formed by the slots of adjacent profiled bars 1. In practice, such slots often have a width between 0.05 mm and 2 mm.

Figure 3A:
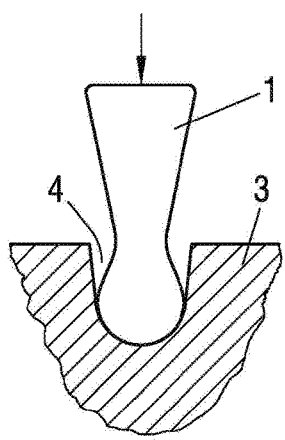
FIG. 3A is a schematic view of a recess with a profiled bar of the screen basket of FIGS. 1-2.

In order to fasten profiled bars 1 in recesses 4, they are pressed radially inward into bar holders 3. In other words, the profiled bars 1 may be press-fitted and located within respective recesses 4. For this purpose, according to FIG. 2 a number of ram segments 5 are arranged in the appropriate production device outside the preassembled screen basket, equally distributed in particular in respect to bar holders 3 and are therein directed in particular toward cylinder axis 2 of the screen basket. Herein, ram segments 5 arranged axially side by side of adjacent bar holders 3 can also be designed as a common ram segment 5. As discussed above, the forces are distributed increasingly more uniformly upon the radial outside of the bar holders in a simultaneous manner during the pressing process. As can be seen in FIGS. 2 and 3A the radial forces, as represented by the radially oriented arrows, are only applied against profiled bars 1 by ram segments 5, which have to be simultaneously applied to maintain the radial nature of the radial forces.

To produce a positive connection between profiled bar 1 and bar holder 3, pressure forces are transferred via ram segments 5 to profiled bars 1. This should occur as uniformly as possible over the circumference, wherein each ram segment 5 respectively acts upon several adjacent profiled bars 1. For this purpose, the pressing surface of all ram segments 5 facing toward profiled bars 1 is formed respectively be a circular segment, the radius of which is consistent with the outside radius of the screen device after the pressing process. Since the outside radius of the screen device formed by profiled bars 1 is slightly larger before the pressing process than afterwards, a slight clearance exists between profiled bars 1 and the pressing surface in the center part of ram segment 5. This clearance may be acceptable at the beginning of the pressing process and the therewith associated pressing forces and is reduced with progressing pressing.

Figure 3B:
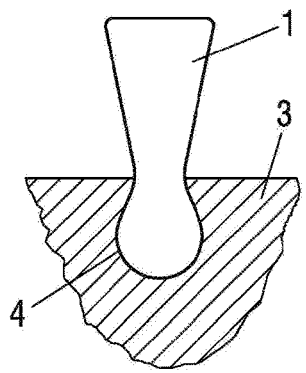
FIG. 3B is another schematic view of a recess with a profiled bar of the screen basket of FIGS. 1-2.

Originating from a relatively large clearance for insertion of profiled bars 1 during preassembly of the screen basket (FIG. 3A) this leads to narrowing of recesses 4 and because of the complementary shape, to clamping of profiled bars 1 (FIG. 3B).

This deformation occurs in a very gentle and uniform manner, so that no excessive strain occurs on bar holders 3. Additional fastening of profiled bars 1 can generally be dispensed with. During pressurization of profiled bars 1, ram segments 5 are guided axially and radially in guide grooves.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A screen production method, comprising:
providing a cylindrical screen device defining a cylinder axis, the cylindrical screen device including a plurality of profiled bars, each of the plurality of profiled bars including a base, a plurality of annular bar holders which are mutually spaced apart from one another and arranged perpendicular to the cylinder axis of the cylindrical screen device, each of the plurality of annular bar holders having edges and an outer face which is provided with recesses that are open at the edges, the recesses having shapes substantially corresponding to the bases of the plurality of profiled bars, the recesses being marginally larger than the bases of the plurality of profiled bars, the recesses being parallel to one another and parallel to the cylinder axis;
inserting the plurality of profiled bars into respective recesses; and
pressing the plurality of profiled bars radially into the respective recesses via radial forces acting onto the plurality of profiled bars until a form-fitting connection is produced, the radial forces only being applied against the plurality of profiled bars, the radial forces being an increasingly more uniform force during the pressing step, the radial forces being simultaneously applied.

2. The method according to claim 1, wherein the plurality of profiled bars are fastened in the respective recesses of the plurality of bar holders exclusively through a clamping that occurs as a result of the step of pressing the plurality of profiled bars.

3. The method according to claim 1, wherein each of the plurality of bar holders has an inside, the inside of the plurality of bar holders is not subjected to supporting or bending forces during the step of pressing the plurality of profiled bars.

4. The method according to claim 1, wherein the cylindrical screen device further includes ram segments, and the step of pressing the plurality of profiled bars occurs via the ram segments acting radially inward upon the plurality of profiled bars.

5. The method according to claim 4, wherein the ram segments are arranged at equal distances over a circumference of the plurality of bar holders.

6. The method according to claim 4, wherein the ram segments respectively act upon a number of the plurality of profiled bars.

7. The method according to claim 4, wherein the ram segments are guided in a radially movable manner.

8. The method according to claim 7, wherein the ram segments are fastened axially relative to the cylinder axis.

9. The method according to claim 4, wherein each of the ram segments includes a pressing surface, the pressing surface is of a concave design facing in a direction of the plurality of profiled bars.

10. The method according to claim 9, wherein the cylindrical screen device has an outer radius, wherein the pressing surface of each ram segment is formed perpendicular to the cylinder axis by a circular segment, the circular segment having a radius that corresponds to the outer radius of the cylindrical screen device.

* * * * *